United States Patent
Rouillon

(10) Patent No.: US 11,648,625 B2
(45) Date of Patent: May 16, 2023

(54) METHOD USING A LASER FOR WELDING BETWEEN TWO METALLIC MATERIALS OR FOR SINTERING OF POWDER(S), APPLICATION FOR MAKING BIPOLAR PLATES FOR PEM FUEL CELLS

(71) Applicant: Commissariat a l'Energie Atomique et aux Energies Alternatives, Paris (FR)

(72) Inventor: Ludovic Rouillon, Villard de Lans (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 1100 days.

(21) Appl. No.: 16/183,070

(22) Filed: Nov. 7, 2018

(65) Prior Publication Data

US 2019/0134744 A1 May 9, 2019

(30) Foreign Application Priority Data

Nov. 8, 2017 (FR) ..................................... 17 60478

(51) Int. Cl.
*B23K 26/211* (2014.01)
*H01M 8/0232* (2016.01)
(Continued)

(52) U.S. Cl.
CPC .......... *B23K 26/211* (2015.10); *B23K 26/009* (2013.01); *B23K 26/123* (2013.01);
(Continued)

(58) Field of Classification Search
CPC .... B23K 26/211; B23K 26/21; B23K 26/009; B23K 26/123; B23K 2101/18;
(Continued)

(56) References Cited

U.S. PATENT DOCUMENTS 4,162,390 A * 7/1979 Kelly .................. B23K 26/123
219/121.84
H158 H * 11/1986 Frausto .................... 219/121.64
(Continued)

FOREIGN PATENT DOCUMENTS

CN 104785780 B 7/2017
DE 10 2010 021 982 A1 12/2011
(Continued)

OTHER PUBLICATIONS

European Office Action dated Feb. 10, 2021 in European Application No. 18200614.8 (with English translation), 4 pages.
(Continued)

*Primary Examiner* — Jimmy Chou
(74) *Attorney, Agent, or Firm* — Oblon, McClelland, Maier & Neustadt, L.L.P.

(57) ABSTRACT

A method for welding between two metallic plates, including:
- (a) fitting a solid plate without openings, configured to be transparent at at least one emission wavelength of a laser beam (F) emitted by a laser (L), between the laser (L) and at least one contact zone between the metallic plates to be welded;
- (a1) inerting of the contact zone via a netural gas, where the neutral gas circulates in channels delimited by the contact zone between the metallic plates and by the solid plate;
- (a2) exerting pressure on the two metallic plates to apply them against one another in the contact zone to be welded, where the application pressure is exerted by the solid plate directly in contact with one of the two metallic plates to be welded; and
(Continued)

(b) emission of a laser beam, through the solid plate, to perform welding of the metallic plates in the contact zone.

6 Claims, 2 Drawing Sheets

(51) Int. Cl.
| | |
|---|---|
| H01M 8/0245 | (2016.01) |
| B23K 26/12 | (2014.01) |
| B23K 26/34 | (2014.01) |
| H01M 8/0256 | (2016.01) |
| B23K 26/00 | (2014.01) |
| B23K 26/21 | (2014.01) |
| H01M 8/10 | (2016.01) |
| B23K 101/34 | (2006.01) |
| B23K 101/18 | (2006.01) |
| H01M 8/1018 | (2016.01) |

(52) U.S. Cl.
CPC .............. *B23K 26/21* (2015.10); *B23K 26/34* (2013.01); *H01M 8/0232* (2013.01); *H01M 8/0245* (2013.01); *H01M 8/0256* (2013.01); *B23K 2101/18* (2018.08); *B23K 2101/35* (2018.08); *H01M 8/1018* (2013.01); *H01M 2008/1095* (2013.01)

(58) Field of Classification Search
CPC ............ B23K 2101/35; H01M 8/0232; H01M 8/0245; H01M 8/0256; H01M 8/1018; H01M 2008/1095
USPC ..................................................... 219/121.64
See application file for complete search history.

(56) References Cited

U.S. PATENT DOCUMENTS

| | | | | |
|---|---|---|---|---|
| 4,879,450 A * | 11/1989 | Valentin | ............... | B23K 26/18 219/121.64 |
| 5,096,518 A * | 3/1992 | Fujikawa | ........... | B23K 15/0053 419/68 |
| 5,776,624 A * | 7/1998 | Neutzler | ............. | H01M 8/0258 429/456 |
| 7,009,136 B2 * | 3/2006 | Schlag | ................ | B23K 26/244 219/121.64 |
| 7,345,258 B2 * | 3/2008 | Yasuda | ................ | B29C 66/652 219/121.64 |
| 7,935,908 B2 * | 5/2011 | Nakagawa | ......... | B23K 26/0093 228/125 |
| 8,089,027 B2 * | 1/2012 | Newman | ............. | H01M 8/0263 219/121.64 |
| 8,263,289 B2 * | 9/2012 | Miyazawa | ............ | H01M 8/021 429/479 |
| 8,283,592 B2 * | 10/2012 | Nakamae | ............ | B23K 26/009 219/121.64 |
| 8,568,940 B2 * | 10/2013 | Newman | ........... | H01M 8/04074 429/409 |
| 8,597,858 B2 * | 12/2013 | Fly | .................... | H01M 8/0273 264/250 |
| 8,721,772 B2 * | 5/2014 | Lee | ........................ | B01D 46/42 55/385.2 |
| 8,882,859 B2 * | 11/2014 | Bae | ..................... | H01M 8/0297 429/456 |
| 8,981,249 B2 * | 3/2015 | Tanaka | ..................... | C09J 5/06 219/121.64 |
| 2003/0098295 A1 * | 5/2003 | Kawamoto | .......... | B23K 26/067 219/121.75 |
| 2004/0072053 A1 * | 4/2004 | Schlag | ............... | H01M 8/0267 429/510 |
| 2004/0084425 A1 * | 5/2004 | Yahaba | ................ | B23K 26/123 219/121.64 |
| 2005/0174042 A1 * | 8/2005 | Nishikawa | ............ | H01L 51/524 313/500 |
| 2005/0252892 A1 | 11/2005 | Newman et al. | | |
| 2006/0054664 A1 * | 3/2006 | Strobel | ............... | H01M 8/0206 228/179.1 |
| 2008/0093348 A1 * | 4/2008 | Seita | .................... | G02B 15/143 219/121.63 |
| 2008/0217307 A1 | 9/2008 | Dauvel et al. | | |
| 2010/0047587 A1 * | 2/2010 | Itoh | ......................... | B29C 66/43 428/411.1 |
| 2010/0270275 A1 * | 10/2010 | Nakamae | ............. | B23K 26/009 219/121.64 |
| 2011/0036817 A1 * | 2/2011 | Ehrmann | ............... | B29C 66/131 219/121.64 |
| 2011/0108529 A1 * | 5/2011 | Wollmann | ........... | B23K 26/037 219/121.63 |
| 2012/0067858 A1 * | 3/2012 | Kangastupa | ....... | B23K 26/0624 219/121.72 |
| 2012/0070723 A1 * | 3/2012 | Matsui | .............. | H01M 10/0404 429/185 |
| 2012/0248076 A1 * | 10/2012 | Hosokawa | ............ | B23K 26/22 219/121.64 |
| 2013/0068384 A1 * | 3/2013 | Liu | ...................... | B23K 26/064 219/121.61 |
| 2014/0231021 A1 * | 8/2014 | Liu | .................... | B23K 26/0624 219/121.64 |
| 2015/0158116 A1 | 6/2015 | Zhang et al. | | |
| 2016/0207146 A1 | 7/2016 | Nirengi et al. | | |
| 2017/0028515 A1 * | 2/2017 | De Souza | ............ | B23K 26/244 |
| 2019/0312255 A1 * | 10/2019 | Dai | ....................... | H01M 4/382 |
| 2020/0206843 A1 * | 7/2020 | Nakamura | ............. | B23K 26/21 |

FOREIGN PATENT DOCUMENTS

| | | |
|---|---|---|
| FR | 2 884 448 A1 | 10/2006 |
| FR | 3 010 339 A1 | 3/2015 |
| JP | 2000-336403 A | 12/2000 |
| JP | 2012-224919 A | 11/2012 |
| JP | 2014-229515 A | 12/2014 |
| WO | WO 03/096457 A1 | 11/2003 |
| WO | WO 2005/120764 A2 | 12/2005 |

OTHER PUBLICATIONS

French Preliminary Search Report dated Apr. 19, 2018 in French Application 17 60478 filed on Nov. 8, 2017 (with English Translation of Categories Cited).
Office Action dated May 12, 2020 in corresponding Japanese Patent Application No. 2018-201650 (with English Translation), 8 pages.
European Office Action dated Sep. 23, 2019 in Patent Application No. 18 200 614.8, (with Machine translation of relevant sections of the Notification), 7 pages.

* cited by examiner

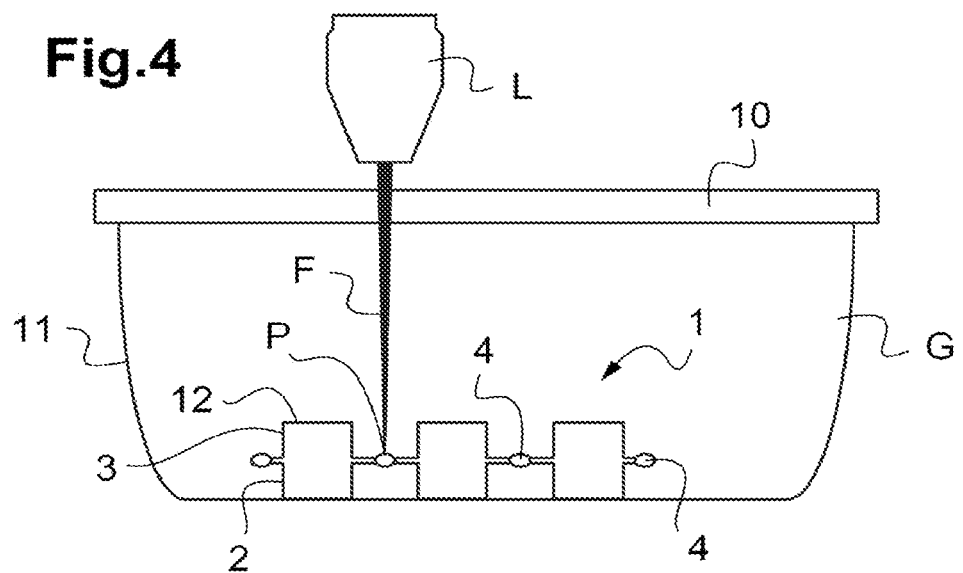
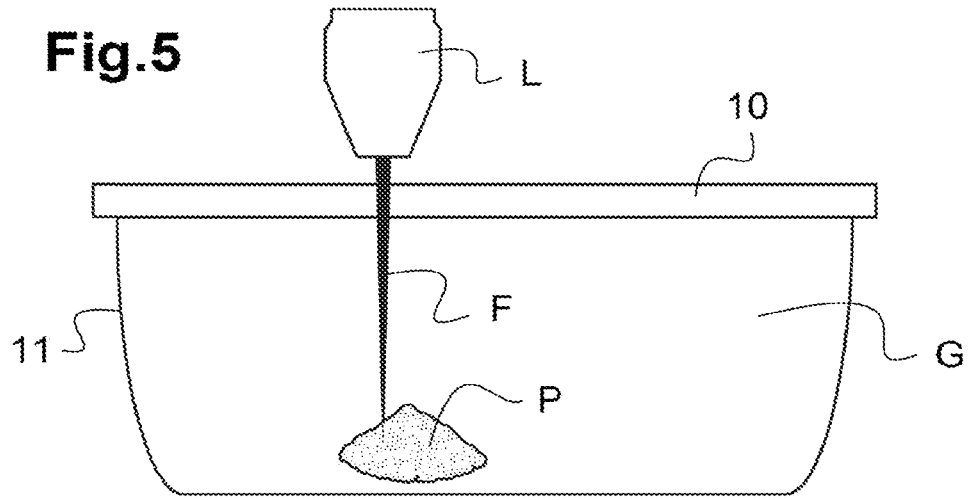

METHOD USING A LASER FOR WELDING BETWEEN TWO METALLIC MATERIALS OR FOR SINTERING OF POWDER(S), APPLICATION FOR MAKING BIPOLAR PLATES FOR PEM FUEL CELLS

TECHNICAL FIELD

The present invention relates to the field of welding between metallic materials as well as sintering of powder(s), by means of a laser.

The invention notably aims to facilitate welding between metal parts or sintering of powder(s) that must be done following complex paths and in addition avoid oxidation of the weld lines/points or sintering zones.

An intended main application relates to the welding of corrugated or ribbed metal plates at the level of the, or of the peaks of the, isthmus corrugations, with the corrugations or ribs of the plates, once welded, internally delimiting hermetic channels for circulation of fluids. They may be so-called bipolar plates forming part of a stack of fuel cells or high-temperature electrolyzers, typically proton exchange membrane fuel cells (PEMFCs).

Although described with reference to this main application, and more particularly the PEMFC application, the invention applies to any type of application in which a high-energy laser is employed for heating or even for locally melting one or more metallic materials, with a view to creating a continuity of material to be assembled.

PRIOR ART

A proton exchange membrane fuel cell PEMFC is an electrochemical device that converts chemical energy directly into electrical energy by catalytic reaction of hydrogen and oxygen. A PEM fuel cell comprises a stack of several cells in series. Each cell generates a voltage typically of the order of 0.7 V and stacking them makes it possible to generate a supply voltage of a higher level, for example of the order of about a hundred volts.

More particularly, a PEM fuel cell comprises unit cells or elementary units each containing a membrane electrode assembly or MEA, which constitutes the electrochemical heart of the fuel cell. Each MEA consists of an electrolytic polymer membrane allowing selective passage of protons and, on either side of this membrane, catalytic layers that form the anode and the cathode.

The membrane therefore makes it possible to separate the anode and cathode compartments. The catalytic layers generally consist of platinum nanoparticles supported on carbon aggregates.

Gas diffusion layers (carbon cloth, felt, etc.) or GDL, conventionally of graphite fibers (carbon cloth, felt, etc.) are arranged on either side of the MEA to provide electrical conduction, uniform admission of the reacting gases and removal of the water produced.

At the anode, decomposition of the hydrogen adsorbed on the catalyst produces protons H+ and electrons e− according to the equation:

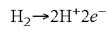

The protons then cross the polymer membrane before reacting with oxygen at the cathode. Reaction of the protons with oxygen at the cathode leads to the formation of water and production of heat according to the equation

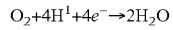

As already mentioned, a PEMFC may comprise a stack of elementary units, and therefore several MEAs arranged between two plates that have to ensure passage of the current and flow of the gases. In a stack of this kind, two adjacent elementary units are generally separated by one and the same plate, one face of which is in contact with the cathode compartment of a first MEA and the other face is in contact with the anode compartment of a second MEA, more exactly in contact with the gas diffusion layers. For this reason, the plates of PEMFCs are generally called "bipolar plates".

Thus, a bipolar plate performs several functions, including:

transport of the electric current collected and electrical connection between the different elementary units;

distribution of the gases ($H_2$, $O_2$ or air) and removal of the water formed at the cathode, via channels and/or orifices provided within it;

impervious separation between the anode and the cathode, thermal regulation of the cells by passing a cooling liquid through them, collection of the electrons generated at the anodes of the various unit cells, mechanical support for ensuring durability of the MEA.

Concretely, for reasons of cost, overall dimensions and performance, these functions are reflected in the fact that a bipolar plate for PEMFCs is generally made of metal.

More precisely, a bipolar plate generally consists of two thin metal plates or sheets that are formed and then joined together by a means such as welding or gluing.

During the welding or gluing step, it is necessary to maintain contact between these two sheets at a certain pressure and, in the case of welding, use inerting to limit the oxidation that could occur at the welded joints.

FIG. 1 shows a bipolar plate 1 of this kind, consisting of two identical metal plates 2, 3 that are formed with grooves 20, 30; 21, 31, respectively.

These plates 2, 3 are assembled together by joints 4. The resultant assembly delimits, by the grooves 20, 30, channels 5, 6 for circulation of hydrogen $H_2$ and oxygen $O_2$ respectively, whereas grooves 21, 31 internally delimit channels 7 for circulation of heat-transfer fluid C.

Laser welding is considered to be the most cost-effective process for assembling the two thin plates/sheets of a bipolar plate for a fuel cell: [1].

These sheets are lap-welded if encapsulation is well controlled: [2]. U.S. Pat. No. 5,096,518 also describes the need for such encapsulation.

If encapsulation is controlled, the beam of a high-energy laser allows fusion of the metal-to-metal contact surfaces without perforating either of the plates.

Encapsulation of these plates may be done in various ways: external pressure plates are commonly used for forming a kind of vice on either side of the sheets, or a negative pressure is generated to clamp the sheets together and hold them physically.

FIG. 2 shows laser welding L with encapsulation of the sheets 2, 3 by means of pressure plates 8, 9.

The bottom plate 8 serves as a base on which the sheets 2, 3 to be assembled are positioned.

The top plate 9 will sandwich sheets 2, 3 with a pressure for maintaining a contact force between the surfaces of the sheets at the level where the joints 4 are to be produced.

As can be seen in FIG. 2, plate 9 is provided with a plurality of through openings 90 to allow access of the beam F of the laser L in order to provide a continuous or spot weld seam in the required joint zones 4. These zones may be complex in their shape and/or their accessibility. They may be, for example, zones between the channels 5, 6, 7, on the perimeter of the openings for gas supply, on the outer perimeter of the sheets 2, 3, etc.

This method of welding using a pressure plate 9 for maintaining metal-to-metal contact has several drawbacks.

Firstly, it is by definition necessary to make a pressure plate with a plurality of through openings.

As the thickness of this pressure plate is limited by the focal length of the laser equipment, these openings may generate a nonuniformity of compressive stress and may, depending on circumstances, typically for large-area bipolar plates, result locally in insufficient force for keeping the two sheets to be assembled in contact during welding.

Furthermore, as these openings must be as small as possible, it is difficult to limit oxidation by inerting. In fact, in practice the inerting system that sends the inerting gas through the openings in the pressure plate, as shown by the arrows in FIG. 2, is conventionally mounted on the nozzle that supports the welding laser. It is consequently very difficult to inert the welded zone owing to the poor access of the gases through the openings.

The openings made in the pressure plate increase the cost of manufacture of the welding equipment and require multiple designs for the different geometries of bipolar plate and therefore the various complex zones to be welded.

One existing alternative consists of performing the welding in several steps with more-localized clamping, i.e. a solution for localized keeping in contact at the level of each joint to be made. This solution has the drawback of requiring stopping the laser beam and intervention for changing the configuration and the pressure plate for welding the whole surface of the sheets to be assembled to obtain the desired bipolar plate.

U.S. Pat. No. 7,009,136B2 proposes a method for maintaining contact between plates/sheets by negative pressure. Thus, a partial vacuum is created between the two interfaces of the plates, the internal space of which defines the circuit for the cooling liquid. This partial vacuum makes it possible to attract the two plates/sheets to one another at the level of their metal-to-metal contact surfaces. The plates/sheets are then welded together at the level of these contact surfaces by means of a laser. This method appears to be advantageous, insofar as it eliminates the drawbacks of the pressure plate with a plurality of through openings.

However, it is difficult in practice to create a negative pressure between plates/sheets comprising many holes and connect them to a vacuum system, without putting a clamping system on the perimeter and on the supply openings of the bipolar plates.

Moreover, after forming, it is found that the metal plates/sheets contain numerous internal mechanical stresses, which generate marked deflection of the bipolar plate in its central zone. This marked deflection proves to be difficult to eliminate solely by the action of negative pressure.

In the context of fuel cells, the bipolar plates obtained may be coated advantageously with a powder to be sintered locally, just as the welds envisaged are local. These powders may be metallic or ceramic. For example, it may be advantageous to deposit a coating for protecting a bipolar plate from the oxidation due to a particular joint. In order to be impervious, the coating must be dense and therefore has to have been sintered. It may be metallic, or ceramic ($ZrO_2$, $Al_2O_3$).

In the field of sintering of metal powders, it is known to use a laser for making components in three dimensions (3D) based on metal. 3D printing on successive layers of metal powders is performed by laser. The process includes inerting with argon and/or nitrogen of the whole of the chamber in which the powder or powders are sintered, in order to avoid melting the parts during fabrication. The equipment is expensive and is not necessarily suitable for all types of components.

It is clear from the foregoing that there is a need to improve the solutions for performing welding of bipolar plates for fuel cells, notably PEM fuel cells, notably in order to overcome the drawbacks of the existing laser welding equipment with pressure plates or a vacuum system.

There is also a need to improve the solutions for sintering of powders, in particular for coating on these same metal plates using a laser.

More generally, there is a need to propose a welding/sintering solution for making metal-metal or metal-ceramic bonds/joints that is simple to implement, effective, of lower cost and that is compatible with inerting.

The aim of the invention is to respond at least partly to these needs.

DISCLOSURE OF THE INVENTION

For this purpose, the invention relates to a method for welding between two metallic materials or for sintering of powder(s), comprising the following steps:

a/ fitting a solid plate that is transparent at the emission wavelength(s) of a laser beam, between said laser and at least one contact zone between the metallic materials to be welded or at least one sintering zone of the powder(s);

b/ emission of the laser beam, through the transparent plate, to perform welding of the materials in the contact zone(s) or sintering of powder(s) in the sintering zone(s).

Thus, the invention consists essentially of passing the welding or sintering laser over a plate without openings that is transparent to the wavelength(s) of said laser, allowing transmission of its beam to the zone(s) to be welded or to be sintered.

Although simple to implement, no-one had thought of devising such a solution.

This transparent plate can thus make it possible to create, easily and at lower cost, a confinement volume in which an inerting gas can be circulated to prevent oxidation of the welded joints or of the powder to be sintered.

In the case of application to the welding together of metal sheets/plates with corrugations and/or ribs, in particular in the case of the production of bipolar plates for fuel cells, the invention has a great many advantages relative to the existing methods, among which we may mention:

elimination of complex machining of an opaque pressure plate for making the plurality of openings for passing the laser beam to each contact zone to be welded, obtaining locally, near the zone to be welded, an optimized state of stress to promote metal-to-metal contact, use of the transparent plate as desired for different geometries of plates/sheets, without being constrained by a welding path or geometry.

According to an advantageous embodiment, the method further comprises, before step b/, a step a1/ of inerting of the contact zone(s) or of the sintering zone(s), the inerting being carried out using a neutral gas, preferably argon and/or nitrogen.

Preferably, step b/ is carried out with the laser beam substantially perpendicular to the transparent plate.

More preferably, step b/ is carried out with the laser beam substantially perpendicular to the contact zone(s) to be welded or to the sintering zone(s).

The material used for the transparent plate that is employed may advantageously be selected from the following materials: glass, polymer, transparent ceramic optionally doped (ytterbium-doped scandium oxide) to limit the absorption.

In the case of welding between two metal plates, the method preferably comprises, before step b/, and if applicable before step a1/, a step a2/ of exerting pressure on the two metal plates to apply them against one another in the contact zone(s) to be welded.

The application pressure according to step c/ may be exerted by the transparent plate directly in contact with one of the two metal plates to be welded.

Advantageously, the inerting gas circulates in the channels delimited by the contact zones between metal plates.

The invention also relates to the use of the method that has just been described for making bipolar plates intended for fuel cells, in particular for proton exchange membrane fuel cells (PEMFCs).

The invention finally relates to the use of the method described above for making sintered coatings on plates.

DETAILED DESCRIPTION

Other advantages and features of the invention will become clearer on reading the detailed description of the invention given for purposes of illustration, and nonlimiting, referring to the following figures, where:

FIG. 4 is a schematic cross-sectional view of laser sintering equipment according to the invention for making a sintered coating on the surface of a bipolar plate according to FIG. 3;

FIG. 5 is a schematic cross-sectional view of laser sintering equipment according to the invention for making a sintered metal component.

For clarity, the same references denoting the same elements of welding equipment and of a bipolar plate of a PEM fuel cell according to the prior art and according to the invention are used for all FIGS. 1 to 5.

It is to be noted that the various elements according to the prior art and according to the invention are shown only for clarity, and they are not to scale.

The terms "top" and "bottom" referring to the pressure plates are to be considered in a configuration with the plates to be welded positioned horizontally and the laser beam positioned vertically.

Figure 1:
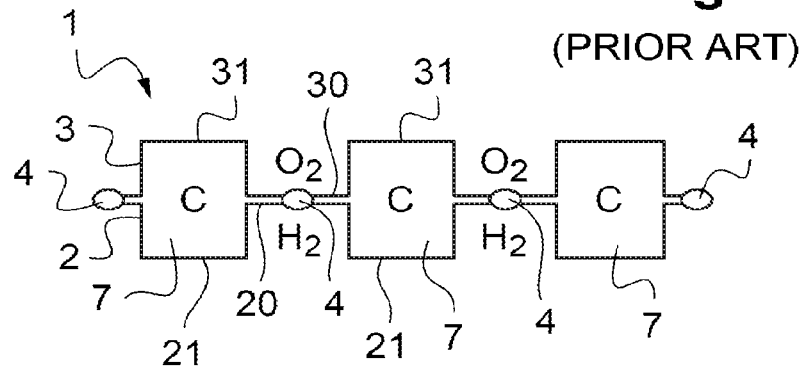
FIG. 1 is a schematic cross-sectional view of a bipolar plate for PEM fuel cells with welded joints.
Figure 2:
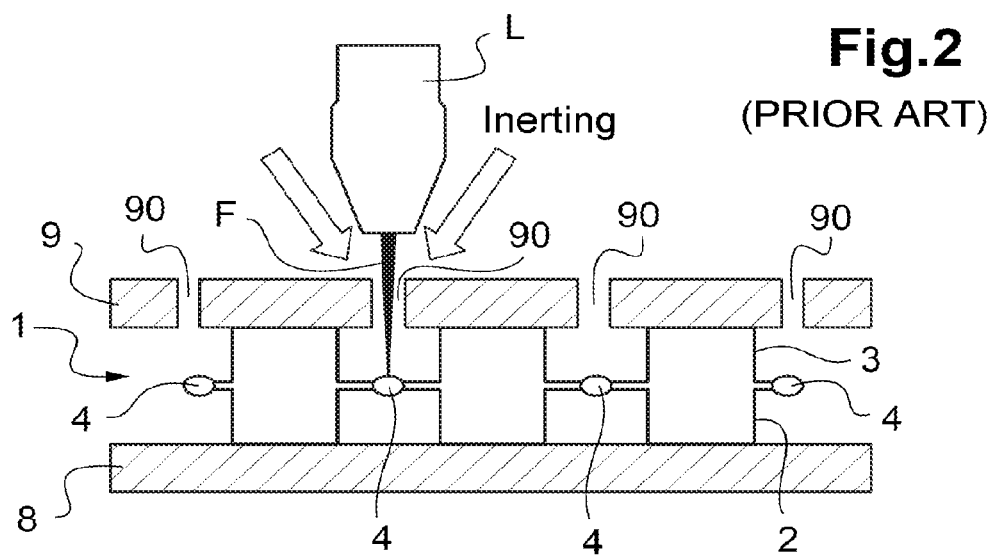
FIG. 2 is a schematic cross-sectional view of laser welding equipment according to the prior art for making a bipolar plate according to FIG. 1.

FIGS. 1 and 2 have already been discussed in detail in the preamble. Therefore they are not described below.

Figure 3:
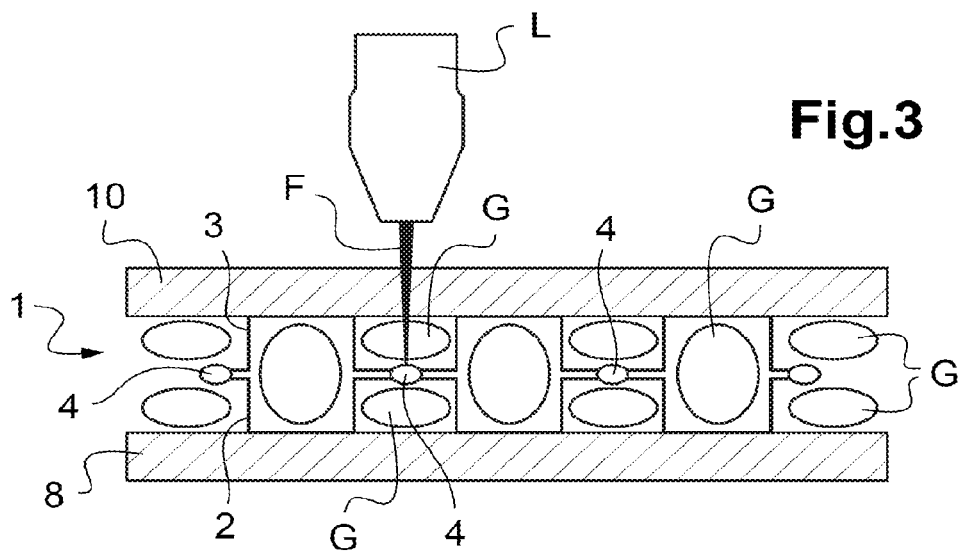
FIG. 3 is a schematic cross-sectional view of laser welding equipment according to the invention for making a bipolar plate according to FIG. 1.

FIG. 3 shows laser welding L with encapsulation of sheets 2, 3 to be assembled together by means of pressure plates 8, 10.

The bottom plate 8 serves as a base on which the sheets 2, 3 to be assembled are positioned.

The solid top plate 10 will sandwich the sheets 2, 3 with pressure for maintaining a contact force between the surfaces of the sheets at the level where the joints 4 are to be made.

As can be seen in FIG. 3, the solid plate 10 according to the invention is transparent to the wavelength(s) of the welding laser L. This solid plate 10 therefore does not have to be provided with well-defined multiple openings, in contrast to plate 9 according to the prior art.

Thus, the beam F of the laser L can pass through plate 10 at any point of the latter in order to provide a continuous or spot weld seam in the required joint zones 4. These zones may be complex in their shape and/or their accessibility. They may be, for example, zones between the channels 5, 6, 7, on the perimeter of the openings for gas supply, on the outer perimeter of the sheets 2, 3, and so on.

Advantageously, during welding, the beam F of the laser L is oriented perpendicular to the transparent plate 10 and the welded zone 4. This makes it possible to avoid having design constraints for the refractive index of the material to be used for plate 10 to avoid a change of direction of the beam F.

The transparent plate 10 may be of glass, of polymer of the acrylic type or of ceramic of the zinc selenide (ZnSe) type. The ceramic may be doped (ytterbium-doped scandium oxide) to limit absorption of the radiation of the laser beam.

The refractive index of plate 10 is advantageously of the order of 1.

The transparent plate 10 without openings makes it possible to define, with plate 8 forming the base, an internal space that is easy to make hermetic. Thus, this space may be filled with an inerting gas G of the nitrogen or argon type, as shown in FIG. 3. The welded zones 4 are thus completely immersed in the inerting gas G that circulates and is confined in the channels delimited by plates 2, 3 and 8, 10.

FIG. 4 illustrates another embodiment employing a transparent plate without openings 10 according to the invention.

Plate 10 will close a container 11 and thus form a space into which an inerting gas G is injected.

The container 11 contains both a bipolar plate 1 and a metal powder P deposited on the surface of the plate so as to obtain a sintered coating 12.

The beam F of the laser L can pass at any point through the transparent plate 10 and reach the powder in very precise zones of the powder to be sintered and thus obtain a uniform sintered coating 12 on the surface of plate 1.

FIG. 5 illustrates another way of obtaining a sintered metal component starting with a container similar to that in FIG. 4 and a transparent plate without openings 10 according to the invention.

The beam F of the laser L can pass at any point through the transparent plate 10 and reach the powder P in very precise zones of the powder to be sintered, to obtain a metallic part of a desired shape.

Other variants and advantages of the invention may be achieved while remaining within the scope of the invention.

For example, if in the execution of welding for obtaining a bipolar plate, the plate that is transparent to the wavelengths of the laser also serves as a pressure plate for keeping the two metal plates in contact in the zones to be welded, it might very well be envisaged that the transparent plate does not have this function of applying pressure and that the latter is provided by other means.

The invention is not limited to the examples that have just been described; it is notably possible to combine together features of the examples illustrated, within variants that are not illustrated.

REFERENCES CITED

[1]: Marcinkoski J, James B D, Kalinoski J A, Podolski W, Benjamin T, Kopasz J. "*Manufacturing process assump-*

*tions, used in fuel cell system cost analyses.*" J Power Sources 196, 2011, 5282-5292

[2]: Cazes, "*Welding with high-energy beams: electron beam and laser.*" Techniques de l'Ingénieur 1994, B7, 740

The invention claimed is:

1. A method of welding between two metallic plates, comprising:
   (a) fitting a solid plate without openings, configured to be transparent at at least one emission wavelength of a laser beam (F) emitted by a laser (L), between said laser (L) and at least one contact zone between the metallic plates to be welded;
   (a1) inerting of the at least one contact zone via a neutral gas;
      wherein the neutral gas circulates in channels delimited by the at least one contact zone between the metallic plates and by the solid plate;
   (a2) exerting pressure on the two metallic plates to apply them against one another in the at least one contact zone to be welded, wherein the application pressure is exerted by the solid plate directly in contact with one of the two metallic plates to be welded; and
   (b) emission of a laser beam, through the solid plate, to perform welding of the metallic plates in the at least one contact zone.

2. The method according to claim 1, wherein the neutral gas is argon and/or nitrogen.

3. The method according to claim 1, wherein the emission (b) is carried out with the laser beam perpendicular to the solid plate.

4. The method according to claim 1, wherein the emission (b) is carried out with the laser beam perpendicular to the at least one contact zone to be welded.

5. The method according to claim 1, wherein material used for the solid plate employed is selected from the following materials: glass, polymer, transparent ceramic, and/or ytterbium-doped scandium oxide to limit absorption.

6. A method of making bipolar plates suitable for fuel cells, comprising:
   implementing the method according to claim 1.

* * * * *